United States Patent [19]

Langley

[11] Patent Number: 4,855,178

[45] Date of Patent: Aug. 8, 1989

[54] COMPOSITE CHAMICAL BARRIER FABRIC

[75] Inventor: John D. Langley, Guntersville, Ala.

[73] Assignee: E. I. Du Pont de Nemours and Company, Wilmington, Del.

[21] Appl. No.: 246,672

[22] Filed: Sep. 19, 1988

Related U.S. Application Data

[63] Continuation-in-part of Ser. No. 189,202, May 2, 1988.

[51] Int. Cl.[4] .................. A62B 17/00; A62D 5/00; B32B 27/12
[52] U.S. Cl. .............................. 428/287; 2/2; 428/311.1; 428/311.5; 428/317.3; 428/319.7; 428/319.9; 428/475.8; 428/476.1; 428/518
[58] Field of Search .................. 2/2, 243; 426/127; 428/287, 311.1, 311.5, 317.3, 319.7, 319.9, 475.8, 476.1

[56] References Cited

U.S. PATENT DOCUMENTS

| | | | |
|---|---|---|---|
| 4,234,647 | 11/1980 | Murphy et al. | 428/319.7 |
| 4,284,674 | 8/1981 | Sheptals | 428/334 |
| 4,355,721 | 10/1982 | Knott et al. | 428/475.8 |
| 4,501,798 | 2/1985 | Koschak | 428/476.1 |
| 4,640,852 | 2/1987 | Ossian | 428/476.1 |
| 4,746,562 | 5/1988 | Fant | 428/476.1 |
| 4,753,840 | 6/1988 | Gompel | 428/287 |
| 4,755,419 | 7/1988 | Shah | 428/476.1 |

Primary Examiner—James C. Cannon

[57] ABSTRACT

A multilayer chemical barrier fabric is made up of a base sheet of nonwoven polypropylene laminated to a multilayer film sheet having a film of ehtylene vinyl alcohol sandwiched between films of nylon with a surface film of linear low-density polyethylene. Fabrics having this structure show resistance to breakthrough within 8 hours for 13 of 15 chemicals listed on the ASTM F1001 chemical test battery and shorter breakthrough times for the other two.

4 Claims, 1 Drawing Sheet

COMPOSITE CHAMICAL BARRIER FABRIC

CROSS REFERENCE OF RELATED APPLICATION

This application is a continuation-in-part of application Ser. No. 189,202, filed May 2, 1988.

FIELD OF THE INVENTION

This invention relates generally to protective fabrics and more particularly to composite fabrics that provide a barrier to permeation by chemicals.

BACKGROUND OF THE INVENTION

One of the requirements for obtaining safe working conditions for employees in various industries or emergency service organizations is the provision of protective garments that prevent toxic chemicals or other contaminants from coming into contact with the worker's body. The need for such protection has been emphasized in recent years by enactment of local, state, and federal laws and/or regulations requiring the use of protective garments under many circumstances.

The effectiveness of materials for protective garments and other chemical barrier application is conventionally determined by permeation tests which measure the time required for a given chemical to permeate through the material on a molecular level. A standardized test procedure for determining effectiveness against a wide variety of chemicals has been established. This procedure is designated by the American Society for Testing and Materials as ASTM F739, "Test Method for Resistance of Protective Clothing Materials to Permeation by Liquids and Gases," and selection of chemicals for testing is governed by ASTM F1001 "Standard Guide for Selection of Chemicals to Evaluate Protective Clothing Materials." The test provides for exposure of materials in a standard two-part permeation cell to fifteen different liquid chemicals, representative of fifteen classes of compounds, until "breakthrough" occurs, this being defined as the time at which the smallest detectable amount, generally one part per million, of resulting gas molecules are measured on the opposite side of a material sample.

Various types of materials have been used for chemical barrier applications including polymeric films, rubber-based sheet material, and multilayer composites made by bonding of film layers to one another or to fabric. While the available materials may provide an effective barrier to some types of chemicals, none other than a fabric disclosed in applicant's above-referenced application are known to prevent permeation of all of the fifteen included in the above-mentioned test procedure. One polymeric film material, for example, is effective for primary alcohols and inorganic mineral acids, but not for saturated hydrocarbons and chlorinated olefins. Another material is effective for many types of chemicals, but not for organic sulfur compounds or heterocyclic ethers. Such gaps in coverage require careful selection of the protective material for its end use environment. In many instances, the specific chemical components in a contaminating mixture, as may be present in waste dumps and hazardous response situations, may be unknown so that selection for a particular contaminant is not feasible. A need thus exists for a barrier material effective for a wide range of chemicals as exemplified by those included in the referenced test procedure.

In addition to providing an effective chemical barrier, materials for protective garments should meet practical requirements for amenability to fabrication by existing methods such as heat bonding of seams, as well as for sufficient physical strength to prevent tearing and the resulting loss of protection.

SUMMARY OF THE INVENTION

The present invention is directed to a composite multilayer chemical barrier fabric having a plurality of sheets of material laminated to one another, including a base sheet comprising a base fabric material and an outer sheet of a multilayer film made up of a central layer of ethylene vinyl alcohol sandwiched between layers of nylon and, on the exposed face of the outer sheet, a heat-sealable polyethylene material. A layer of a suitable adhesive is disposed between the base sheet and the outer sheet.

Composite fabrics embodying the invention provide protection against permeation by a wide variety of chemicals. When tested according to the procedure referred to above, such fabric showed no breakthrough within 8 hours for 13 of the 15 chemicals, and, of the remaining 2 chemical permeants, 1 showed no breakthrough for over 6 hours and the other for 41 minutes. Protective garments made of these fabrics may thus be effectively used for prolonged periods in most contaminating chemical environments and for shorter periods in those containing certain specified types of chemicals. Fabrics embodying this invention show favorable strength characteristics and durability, and they may be readily fabricated into garments by heat-sealing methods.

It is, therefore, an object of this invention to provide a composite multilayer fabric material that provides an effective barrier to permeation by a wide variety of chemicals.

Another object is to provide such a fabric material that is amenable to fabrication into protective garments by heat sealing of seams.

Another object is to provide such a fabric material that has favorable strength and durability.

Other objects and advantages of the invention will be apparent in the following detailed description and claims appended hereto.

DESCRIPTION OF THE PREFERRED EMBODIMENT

Figure 1:
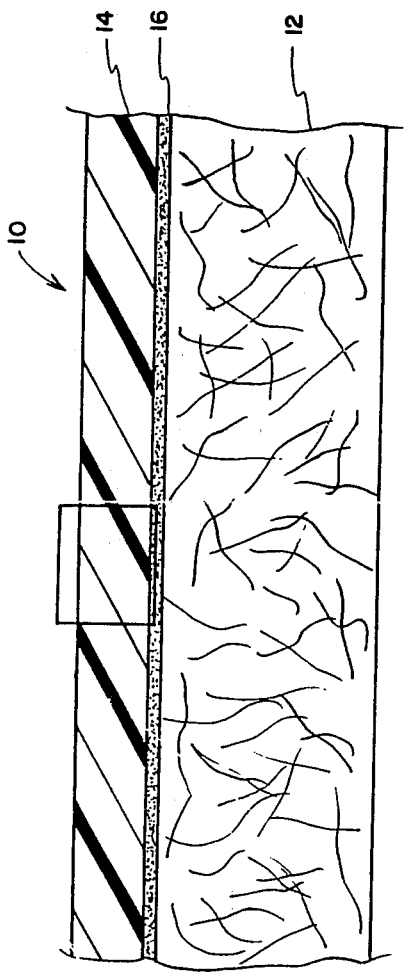
FIG. 1 is an enlarged cross-sectional view of a multilayer composite fabric material embodying the invention.

Referring to FIG. 1, a composite fabric material 10 is shown. The composite includes a base sheet 12 of nonwoven polypropylene fabric and a multilayer film sheet 14 laminated to the base sheet by means of adhesive layer 16.

A base sheet 12 is selected to provide a relatively bulky, high-strength substrate. As shown in FIG. 1, the base sheet may be about four times the thickness of the other components of the composite. Nonwoven polypropylene available from Phillips Fibers Corporation under the trademark "Duon" may be used for this purpose. A 2.3-ounce fabric designated as L17307 is preferred. Other fabrics which are bondable to the film sheet of the composite may be used, for example, fabrics of other polymeric materials such as polyesters.

Figure 2:
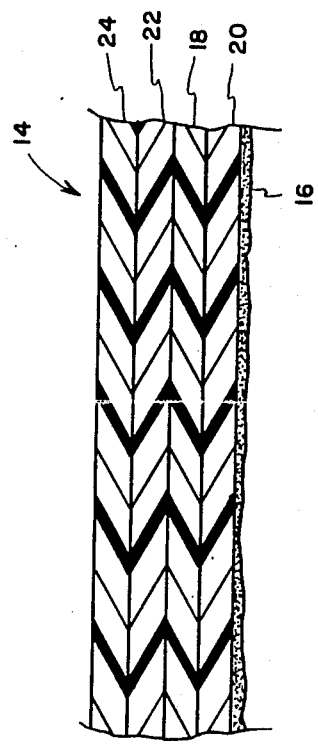
FIG. 2 is an enlarged cross-sectional view showing the structure of the top multilayer sheet of FIG. 1.

As shown in FIG. 2, the multilayered film sheet 14 which is laminated to the base sheet includes a film 18 of ethylene vinyl alcohol sandwiched between films 20 and 22 of nylon, with the upper film 22 being bonded to an outer film 24 of linear low-density polyethylene. A suitable film sheet material with such construction and having a thickness of three mils is available from Print Pack, Inc., under the designation Omniflex TM, No. C44-442.

As shown in FIG. 1, an adhesive film 16 is provided for lamination of base sheet 12 to the ethylene vinyl alcohol containing sheet 14. The adhesive is selected for its compatability with unwoven polypropylene and with the nylon film to which the ethylene vinyl alcohol film is bonded. A blended mixture of EMA (ethylene methyl acrylic) and low-density polyethylene may be used for this purpose. Preferably, the adhesive is applied to a thickness of 1 to 1.25 mils.

To provide the desired color to the fabric, a pigment may be incorporated in adhesive layer 16.

Fabrics embodying the invention may be prepared by means of extruding the adhesive layer between the base fabric and the multilayer film sheet and immediately cooling the composite with a chill roller.

Samples of a fabric having the structure described above were subjected to independent laboratory testing by exposure to the fifteen chemicals listed below using the ASTM F739 method, the fifteen chemicals constituting those included in the ASTM F1001 chemical test battery. The chemicals tested and the class of compounds represented by each were as follows:
acetone, ketone;
acetonitrile, nitrile;
carbon disulfide, organic sulfur;
dichloromethane, chlorinated paraffin;
diethylamine, amine;
dimethyl-formamide, amide;
ethyl acetate, ester;
n-hexane, saturated hydrocarbon
methanol, primary alcohol;
nitrobenzene, nitro compound;
sodium hydroxide 50%, inorganic base;
sulfuric acid 93%, inorganic mineral acid:
tetrachloroethylene, chlorinated olefin;
tetrahydrofuran, heterocyclic & ether; and
toluene, aromatic hydrocarbon.

Results obtained are shown in the following table:

| CHEMICAL | TIME TO BREAK-THROUGH (min) | PERMEATION RATE (ug/cm2 min) | SYSTEM DETECTION LIMIT (ppm) |
| --- | --- | --- | --- |
| acetone | >480 | nd | .1 |
| acetonitrile | >480 | nd | .18 |
| carbon disulfide | >480 | nd | .99 |
| dichloromethane | 369 | .054 | .17 |
| diethylamine | >480 | nd | .71 |
| diemthlyformamide | >480 | nd | 1 |
| ethyl acetate | >480 | nd | .072 |
| hexane | >480 | nd | .023 |
| methanol | 41 | 4.3 | .16 |
| nitrobenzene | >480 | nd | 1 |
| sodium hydroxine | >480 | nd | .13 |
| sulfuric acid | >480 | nd | .0095 |
| tetrachloroethylene | >480 | nd | .07 |
| tetrahydrofuran | >480 | nd | .13 |
| toluene | >480 | nd | .036 |

It may be seen from the above that 13 of the 15 chemicals tested showed no breakthrough within 8 hours. Of the other 2, dichloromethane showed breakthrough only after over 6 hours and methanol after 41 minutes.

Fabrics embodying the invention thus may be effectively used for protective garments and chemical barriers in most contaminating environments. Only in the case of alcohols, as exemplified by methanol, does the chemical permeate through the fabric in measurable amounts in less than six hours. Even for alcohols, short-term protection is provided.

Typical physical properties of fabric prepared and tested as described above were determined as follows:

| weight (oz/sy) | 5.3 |
| --- | --- |
| thickness (mils) | 21 |
| flammability | NFPA 702 Class 1 (normal) |

Physical properties measured per ASTM D751-79:

| Mullen burst (PSI) | | 174 |
| --- | --- | --- |
| grab tensil (lbs.) | MD | 110 |
|  | XD | 88 |
| elongation (%) | MD | 36 |
|  | XD | 46 |
| tongue tear (lbs.) | MD | 19.4 |
|  | XD | 20.0 |

MD - machine direction
XD - cross direction

The applicant has provided a major improvement in chemical barrier fabrics by obtaining fabrics with long-term resistance to permeation by most chemical compounds representing diverse classes of chemicals and shorter-term resistance to others. Use of a relatively bulky, high-strength substrate serves to minimize stress cracking and other physical degradation of the multilayer film sheet. In addition, the fabric may be readily made up into garments using heat-sealed seams, and such garments show favorable durability and economy.

I claim:

1. A composite multilayer fabric consisting essentially of:
   a base sheet of relatively bulky, high-strength substrate and a multilayer film sheet laminated to one face of the base sheet; and
   said multilayer film sheet comprising a film of ethylene vinyl alcohol, a film layer of nylon laminated to each face thereof, and an outer film of heat-sealable polyethylene.

2. The fabric of claim 1 wherein said base sheet is nonwoven polypropylene fabric.

3. The fabric of claim 2 wherein said outer film of polyethylene is linear low-density polyethylene.

4. The fabric of claim 3 including a layer of adhesive disposed between said base sheet and said multilayer film sheet.

* * * * *